United States Patent
Brun et al.

(10) Patent No.: US 9,388,712 B2
(45) Date of Patent: Jul. 12, 2016

(54) METHODS AND APPARATUS FOR AN OXY-FUEL BASED POWER CYCLE

(75) Inventors: Klaus Brun, Helotes, TX (US); Marybeth G. Nored, San Antonio, TX (US); Jason T. Gatewood, San Antonio, TX (US); James J. Moore, Midlothian, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 1212 days.

(21) Appl. No.: 12/903,979

(22) Filed: Oct. 13, 2010

(65) Prior Publication Data

US 2012/0090352 A1    Apr. 19, 2012

(51) Int. Cl.
| | |
|---|---|
| F02C 1/10 | (2006.01) |
| F01K 25/10 | (2006.01) |
| F02C 3/34 | (2006.01) |
| F02C 1/08 | (2006.01) |
| F02C 6/18 | (2006.01) |

(52) U.S. Cl.
CPC ............. *F01K 25/103* (2013.01); *F02C 1/08* (2013.01); *F02C 1/10* (2013.01); *F02C 3/34* (2013.01); *F02C 6/18* (2013.01)

(58) Field of Classification Search
CPC ............. F02C 3/34; F02C 1/08; F02C 1/10; F02C 6/18; F01K 25/103
USPC ........................... 60/772, 39.5, 39.52
See application file for complete search history.

(56) References Cited

U.S. PATENT DOCUMENTS

| | | | | |
|---|---|---|---|---|
| 4,498,289 | A * | 2/1985 | Osgerby ............... | 60/39.52 |
| 6,269,624 | B1 * | 8/2001 | Frutschi et al. ........ | 60/783 |
| 6,871,502 | B2 * | 3/2005 | Marin et al. .......... | 60/772 |
| 2001/0042367 | A1* | 11/2001 | Frutschi et al. ........ | 60/39.02 |
| 2004/0224210 | A1* | 11/2004 | Agnew .................. | 429/34 |
| 2005/0076645 | A1* | 4/2005 | Frutschi et al. ........ | 60/772 |
| 2007/0199300 | A1* | 8/2007 | MacAdam et al. ...... | 60/39.52 |
| 2007/0272178 | A1 | 11/2007 | Brun et al. | |
| 2009/0191076 | A1 | 7/2009 | Deffenbaugh et al. | |
| 2010/0124509 | A1 | 5/2010 | Brun et al. | |
| 2011/0023980 | A1 | 2/2011 | Brun et al. | |
| 2012/0090352 | A1* | 4/2012 | Brun et al. ............. | 62/617 |

* cited by examiner

*Primary Examiner* — Phutthiwat Wongwian
*Assistant Examiner* — Marc Amar
(74) *Attorney, Agent, or Firm* — Grossman, Tucker et al

(57) ABSTRACT

Methods and apparatus for an oxy-fuel combustion power cycle are provided, including converting gaseous carbon dioxide to liquid and/or supercritical carbon dioxide which may include the use of a cryogenic pump, removing a portion of the liquid and/or supercritical carbon dioxide from the cycle, combusting oxygen and a combustion fuel with the remaining liquid and/or supercritical carbon dioxide in an oxy-fuel combustor to generate steam and additional liquid and/or supercritical carbon dioxide which replaces the portion of the liquid and/or supercritical carbon dioxide sequestered from the cycle.

19 Claims, 3 Drawing Sheets

FIG. 2

|  | Temperature (degF) | Pressure (psi) | Temperature (K) | Pressure (MPa) | Pressure (bar) | Density (kg/m³) | Enthalpy (kJ/kg) | Entropy (kJ/kg-K) |
|---|---|---|---|---|---|---|---|---|
| State 1 | 100.000 | 15.000 | 310.778 | 0.103 | 1.034 | 1.769 | 516.650 | 2.769 |
| State 2 | 558.176 | 300.000 | 565.320 | 2.068 | 20.684 | 19.518 | 758.100 | 2.769 |
| State 3 | -20.000 | 300.000 | 244.111 | 2.068 | 20.684 | 1073.800 | 135.330 | 0.756 |
| State 4 | -14.800 | 2199.932 | 247.000 | 15.168 | 151.679 | 1103.200 | 142.350 | 0.735 |
| State 5 | 982.778 | 2199.932 | 801.210 | 15.168 | 151.679 | 98.097 | 1011.849 | 2.766 |
| State 6 | 98.456 | 14.997 | 309.920 | 0.103 | 1.034 | 1.774 | 515.900 | 2.766 |

METHODS AND APPARATUS FOR AN OXY-FUEL BASED POWER CYCLE

FIELD OF THE INVENTION

The present invention relates to energy production and by-product capture or sequestration, and more particularly, to systems, apparatus and methods of energy production utilizing oxy-fuel based power cycles and capture of carbon dioxide.

BACKGROUND

Carbon dioxide emissions from fossil-fuel based power plants and the reduction thereof are a major focus of climate change initiatives, given the understanding that such carbon dioxide may be contributing to global warming and the volume of carbon dioxide emitted from power plants is considered significant.

In light of the foregoing, it is desirable to have power plants with power production methods and apparatus that may reduce carbon dioxide emissions associated with producing power. One particular way to reduce carbon dioxide emissions associated with producing power may be to capture any resultant produced carbon dioxide prior to emission to the atmosphere. However, once captured the carbon dioxide ordinarily may be transferred to a sequestration site for storage, which can be costly.

What is needed are methods and apparatus to capture carbon dioxide associated with producing power from fossil fuels and to provide the carbon dioxide in a sequestration-ready state that can be immediately placed into transportation pipelines and stored at a desired sequestration site.

SUMMARY

An oxy-fuel based power cycle is disclosed that combines use of gaseous, liquid and liquid and/or supercritical phases of carbon dioxide and the associated pumping of carbon dioxide to produce both useable power and provide sequestration-ready carbon dioxide for sequestration or transportation.

According to one embodiment of the invention, a method for sequestering carbon dioxide from an oxy-fuel based power cycle is provided, the method comprising providing gaseous carbon dioxide expelled from a apparatus that provides energy from a fluid flow, compressing the gaseous carbon dioxide to increase a density of the gaseous carbon dioxide and converting the gaseous carbon dioxide to liquid carbon dioxide by cooling the gaseous carbon dioxide. This may then be followed by converting all or a portion of the liquid carbon dioxide to supercritical carbon dioxide by compressing the liquid carbon dioxide, removing a portion of the liquid and/or supercritical carbon dioxide from the cycle and introducing oxygen, a combustion fuel and the liquid and/or supercritical carbon dioxide remaining in the cycle to an oxy-fuel combustor. This may then be followed by combusting the oxygen and the combustion fuel with the liquid and/or supercritical carbon dioxide in the oxy-fuel combustor to generate steam and additional liquid and/or supercritical carbon dioxide which replaces the portion of the liquid and/or supercritical carbon dioxide removed from the cycle. One may then introduce the steam and liquid and/or supercritical carbon dioxide from the oxy-fuel combustor to an apparatus that provides energy from a fluid flow and converting the liquid and/or supercritical carbon dioxide to gaseous carbon dioxide by expanding the liquid and/or supercritical carbon dioxide.

In certain embodiments, compressing the gaseous carbon dioxide to increase the density of the gaseous carbon dioxide may be performed within a compressor configured to provide isentropic compression or performed within a compressor configured to provide isothermal compression. Compressing the gaseous carbon dioxide may be performed from a suction pressure between atmospheric and 30 psi to a discharge pressure of at least 300 psi. With isothermal compression, the temperature of the compressed gaseous carbon dioxide may be in a range between and including 50° F. to 600° F.

In certain embodiments, converting the gaseous carbon dioxide to liquid carbon dioxide by cooling the gaseous carbon dioxide may be performed within a condenser configured to provide isobaric cooling. Converting the gaseous carbon dioxide to liquid carbon dioxide may be performed by cooling to a temperature in a range between and including 0° F. to −60° F., and more particularly at a temperature of at least −20° F.

In certain embodiments, converting all or a portion of the liquid carbon dioxide to supercritical carbon dioxide by compressing the liquid carbon dioxide may be performed within a cryogenic pump. Converting all or a portion of the liquid carbon dioxide to supercritical carbon dioxide may be performed at a pressure in a range between 300 psi to 4000 psi.

In certain embodiments, removing a portion of the liquid and/or supercritical carbon dioxide from the cycle is performed with a diverter device.

In certain embodiments, the oxy-fuel combustor may be configured to provide isobaric combustion.

In certain embodiments, combusting the oxygen and the combustion fuel with the liquid and/or supercritical carbon dioxide to provide additional liquid and/or supercritical carbon dioxide which replaces the portion of the liquid and/or supercritical carbon dioxide removed from the cycle is performed at a temperature in a range between and including 800° F. to 1500° F., and more particularly at a temperature less than 1100° F.

In certain embodiments, the apparatus that provides energy from the fluid flow may be configured to provide isentropic expansion.

In certain embodiments, heat generated from compressing the gaseous carbon dioxide to increase the density of the gaseous carbon dioxide may be used to increase a temperature of the liquid and/or supercritical carbon dioxide prior to removing the portion of the liquid and/or supercritical carbon dioxide from the cycle.

In certain embodiments, heat generated from compressing the gaseous carbon dioxide to increase the density of the gaseous carbon dioxide may be used to increase a temperature of the steam and liquid and/or supercritical carbon dioxide introduced to the apparatus that provides energy from a fluid flow.

In certain embodiments, the additional liquid and/or supercritical carbon dioxide which replaces the portion of the liquid and/or supercritical carbon dioxide removed from the cycle may be equal to the portion of the liquid and/or supercritical carbon dioxide removed from the cycle.

According to another embodiment of the invention, an apparatus is disclosed that provides an oxy-fuel based power cycle, the apparatus comprising a compressor configured to receive gaseous carbon dioxide to compress the gaseous carbon dioxide to increase a density of the gaseous carbon dioxide, a condenser configured to receive the gaseous carbon dioxide from the compressor and covert the gaseous carbon dioxide to liquid carbon dioxide, a cryogenic pump configured to receive the liquid carbon dioxide from the condenser and convert all or a portion of the liquid carbon dioxide to supercritical carbon dioxide. A diverter device may then be provided configured to receive the liquid and/or supercritical carbon dioxide from the cryogenic pump and remove a portion of the liquid and/or supercritical carbon dioxide from the cycle along with an oxy-fuel combustor configured to receive oxygen, a combustion fuel and the liquid and/or supercritical carbon dioxide from the cryogenic pump remaining in the cycle, and combust the oxygen and the combustion fuel with the liquid and/or supercritical carbon dioxide to generate steam and additional liquid and/or supercritical carbon dioxide which replaces the portion of the liquid and/or supercritical carbon dioxide removed from the cycle. A component may then be provided configured to receive the liquid and/or supercritical carbon dioxide from the oxy-fuel combustor wherein the component operates to provide energy by an expansion of the liquid and/or supercritical carbon dioxide to gaseous carbon dioxide.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein:

FIG. 2 is a table showing the exemplary state conditions for the cryogenic $CO_2$ oxy-combustion cycle of FIG. 1.

DETAILED DESCRIPTION

Figure 1:
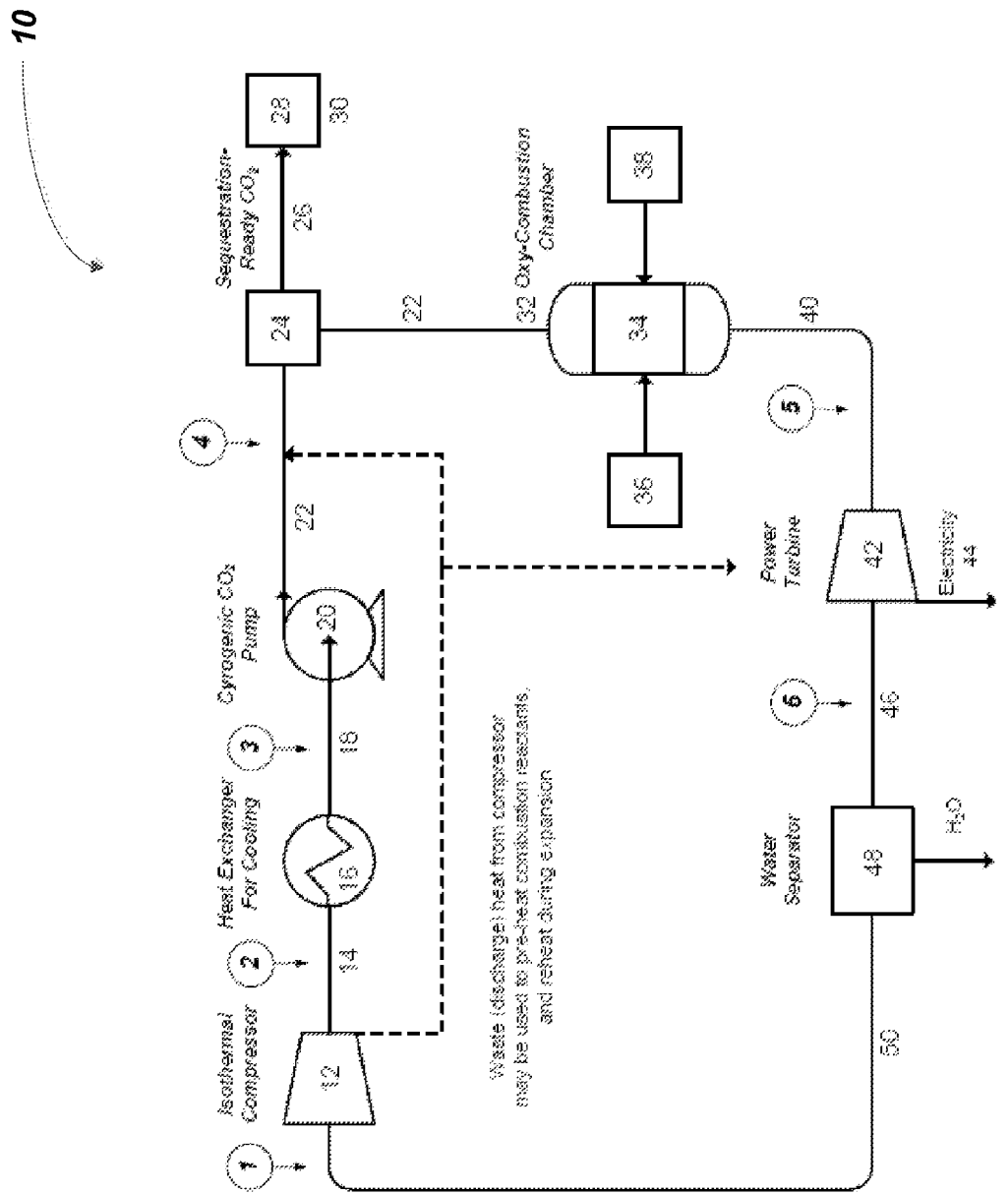
FIG. 1 is a diagram for an exemplary oxy-fuel based power cycle according to the present invention, with optional waste (discharge) heat usage/reheating.
Figure 3:
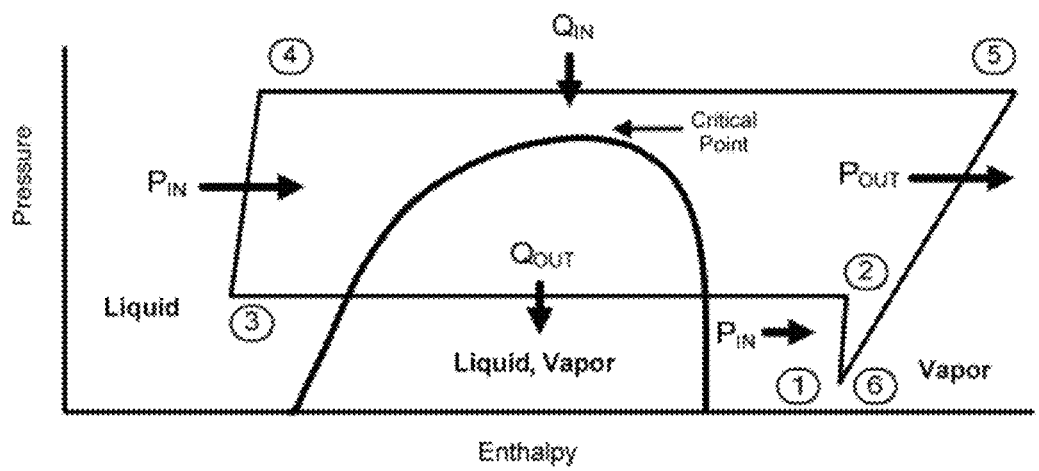
FIG. 3 is an exemplary pressure—enthalpy diagram for the exemplary cycle.
Figure 4:
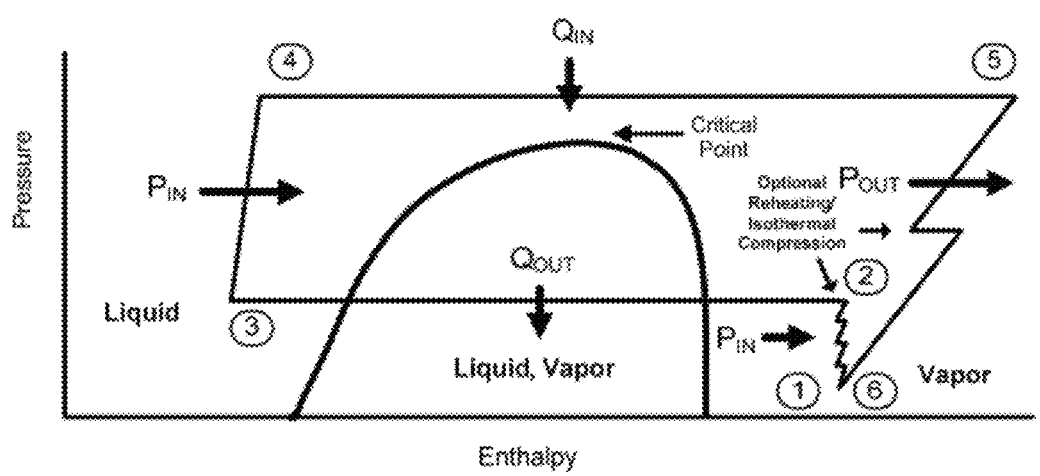
FIG. 4 is an exemplary pressure—enthalpy diagram for the exemplary cycle of FIG. 3 with optional waste (discharge) heat usage/reheating and isothermal compression.

It may be appreciated that the present disclosure is not limited in its application to the details of construction and the arrangement of components set forth in the following description or illustrated in the drawings. The embodiments herein may be capable of other embodiments and of being practiced or of being carried out in various ways. Also, it may be appreciated that the phraseology and terminology used herein is for the purpose of description and should not be regarded as limiting as such may be understood by one of skill in the art.

For example, various terms used herein gaseous carbon dioxide ($CO_2$) may be understood to refer to carbon dioxide in a gas state, liquid carbon dioxide may be understood to refer to carbon dioxide in a liquid state and supercritical carbon dioxide may be understood to refer to carbon dioxide in a supercritical fluid state. Also, as used herein, a supercritical fluid may be understood to be a substance which is above its critical temperature and critical pressure.

Referring to FIG. 1, there is shown an exemplary oxy-fuel based power system/cycle 10 according to the present invention, which may be more particularly described as a cryogenic carbon dioxide oxy-combustion system/cycle. The system/cycle 10 will now be described in detail with reference to FIG. 1.

In State 1, gaseous carbon dioxide expelled from a turbine 42 and passing through a water separator 48 (described in greater detail below) may be found to be at relatively low pressure as compared to other portions of system/cycle 10. Hence, State 1 may be considered to be on a relatively low pressure side of the system/cycle 10. In particular, as shown in FIG. 2, the gaseous carbon dioxide may be at an exemplary pressure of 15 psi and an exemplary temperature of 100° F. (which are near atmospheric pressure and temperature which may be found to occur at sea level). However, it should be understood that the temperature and pressure of the gaseous carbon dioxide should be merely considered as exemplary and not limiting. For example, the gaseous carbon dioxide may be at a pressure in a range between and including 14 psi to 30 psi, and at a temperature in a range between and including 50° F. to 150° F.

The gaseous carbon dioxide may then enter a compressor 12 configured to receive the gaseous carbon dioxide from the turbine 42, particularly from fluid passages 46 and 50 and compress the gaseous carbon dioxide to increase the density of the gaseous carbon dioxide. The compressor 12 may be further configured to operate with isentropic compression (i.e. no heat is added or removed from the gaseous carbon dioxide and the entropy is constant) or configured to operate with isothermal compression (i.e. configured to maintain the gaseous carbon dioxide at constant temperature, here by removing heat from the gaseous carbon dioxide as the gaseous carbon dioxide is compressed). In the case of isentropic compression the temperature of the gas may increase up to about 750° F. In the case of isothermal compression, the temperature may increase up to about 200° F., or in the range of 150° F. to 200° F.

The gaseous carbon dioxide may preferably be compressed by the compressor 12 to a pressure suitable for use by the downstream heat exchanger 16. In other words, the compressor 12 may be configured to compress the gaseous carbon dioxide to a pressure suitable for use by the heat exchanger 16. For example, the gaseous carbon dioxide may be compressed to an operating pressure of the heat exchanger, such as at least 300 psi. However, it should be understood that the pressure of the compressed gaseous carbon dioxide should be merely considered as exemplary and not limiting. For example, the compressed gaseous carbon dioxide emerging from compressor 12 may be preferably be at a pressure in a range between and including 300 psi to 400 psi and at a temperature in the range of 50° F. to 150° F.

As shown in FIG. 2, with isentropic compression, the gaseous carbon dioxide discharged into fluid passage 14 from the isentropic compressor at State 2 may preferably have a temperature of 558° F. at a pressure of 300 psi. As also shown in FIG. 2, there is preferably no change in entropy from State 1 to State 2, thus this thermodynamic process step may be considered to be a reversible isentropic process, which is also adiabatic.

Alternatively, as indicated above, compressor 12 may be configured to operate with isothermal compression, with the discharge temperature of the compressed gaseous carbon dioxide in the range, for example, between and including 150° F. to 200° F. As further discussed below, the heat that is removed from the gaseous carbon dioxide and discharged from the isothermal compressor during isothermal compression may be provided to be utilized at other parts of the system/cycle 10. In particular, for example, the heat may be used to supplement the system/cycle 10 by pre-heating combustion reactants downstream, or reheating during the expansion process. Isothermal compression may be performed with an intercooled isothermal compressor, which may be understood as a compressor which may remove the heat of compression internal to the compressor.

Upon compression with the compressor 12 to a pressure of 300 psi, the compressed gaseous carbon dioxide may be understood to now be on the high pressure side of the system/cycle 10, the compressed gaseous carbon dioxide may flow through a fluid passage 14 and enter a heat exchanger/condenser 16 configured to receive the compressed gaseous carbon dioxide from compressor 12, particularly from fluid passage 14 and convert the compressed gaseous carbon dioxide to liquid carbon dioxide. The heat exchanger/condenser 16 may be further configured to operate with isobaric heat exchange/cooling (i.e. configured to maintain the compressed gaseous carbon dioxide at constant pressure).

In this process step of the system/cycle 10, the compressed gaseous carbon dioxide may undergo heat exchange within the isobaric heat exchanger/condenser 16 with the heat exchanger 16 functioning as a condenser to cool the gaseous carbon dioxide until it is condensed to a liquid phase. The compressed gaseous carbon dioxide may be brought to a temperature to provide a liquid phase, for example, a temperature of −20° F. As shown in FIG. 2, in State 3, the liquefied carbon dioxide preferably has a temperature of at least −20° F. However, it should be understood that the temperature of the liquid carbon dioxide should be merely considered as exemplary and not limiting. For example, the liquid carbon dioxide may be at a temperature in a range between and including 0° F. to −60° F.

After being condensed to a liquid, the liquid carbon dioxide discharged from the heat exchanger/condenser 16 may flow in a fluid passage 18 to where it may enter a pump 20 configured to receive the liquid carbon dioxide from the heat exchanger/condenser 16, particularly from fluid passage 18. The pump may retain the carbon dioxide in the liquid phase or convert it to a supercritical carbon dioxide (i.e. above the critical temperature of carbon dioxide of 31.1° C. and critical pressure of 72.9 atm). Pump 20 may also be configured to operate at cryogenic temperatures and corresponding pressures. With cryogenic pump 20, the liquefied carbon dioxide may be pumped and further pressurized (compressed). As shown in FIG. 2, from the cryogenic pump 20 the liquefied carbon dioxide in State 4 may preferably be brought to a temperature of −15° F. at 2,200 psi. However, it should be understood that the temperature and pressure of the carbon dioxide should be merely considered as exemplary and not limiting. For example, the carbon dioxide in State 4 may be at a pressure in a range between and including 2000 psi to 4000 psi and at a temperature range of 0° F. to −60° F.

Upon discharge from cryogenic pump 20, the liquid and/or supercritical carbon dioxide may flow through fluid passage 22 to gas generator 32, and more particularly an oxy-fuel combustor. However, prior to the liquid and/or supercritical carbon dioxide reaching oxy-combustion chamber 32, a portion of the carbon dioxide may be drawn off or otherwise sequestered from the system/cycle 10 at a diverter device 24, which may comprise a diverter valve. Thus, device 24 may be configured to receive the liquid and/or supercritical carbon dioxide from the cryogenic pump 20 and remove a portion of the liquid and/or supercritical carbon dioxide from the system/cycle 10.

Liquid and/or supercritical carbon dioxide which is drawn off or diverted from the system/cycle 10 may flow into take-off (removal) fluid passage 26 and the sequestration-ready supercritical or liquid carbon dioxide may be introduced to a carbon dioxide reservoir 28. The carbon dioxide reservoir 28 may be held in a storage structure 30, which may comprise, for example, a container (e.g. supply tank) or geological structure (e.g. underground cavern or mine).

The amount of liquid or supercritical carbon dioxide drawn off or removed from the system/cycle 10 prior to the oxy-fuel combustor 32 may preferably be equal to that of the carbon dioxide produced by the oxy-fuel combustor 32. Carbon dioxide removed from the system/cycle 10 may be sequestered, or used in another commercial or manufacturing process (e.g. decaffeination of coffee). In addition, optionally, any heat discharged from the compressor 12 could be utilized elsewhere in the system, such as to pre-heat the liquid or supercritical carbon dioxide from the cryogenic pump 20 prior to being drawn off or combustion. Such pre-heating may include boosting the temperature of the liquid or supercritical carbon dioxide between 50° F. to 800° F. The discharged heat may also be used in the expansion of the carbon dioxide, explained more fully below.

Oxy-fuel combustor 32 may be configured to receive pure oxygen ($O_2$), a combustion fuel such as natural gas ($CH_4$), coal, or any other hydrocarbon fuel, and the liquid and/or supercritical carbon dioxide from the cryogenic pump 20 remaining in the cycle, particularly from fluid passage 22. The liquid and/or supercritical carbon dioxide directed to the oxy-fuel combustor 32 may enter into an oxy-combustion chamber 34 of the oxy-fuel combustor 32, typically by being injected, along with the oxygen, particularly from an air separation apparatus 36, and the combustion fuel, particularly from a fuel processing apparatus 38.

Oxy-fuel combustor may be further configured to combust the oxygen and the combustion fuel with the liquid and/or supercritical carbon dioxide to generate steam and additional liquid and/or supercritical carbon dioxide which replaces the portion of the liquid and/or supercritical carbon dioxide removed from the system/cycle 10 at diverter 24. In addition, oxy-fuel combustor 32 may be further configured to operate with isobaric combustion (i.e. configured to maintain the reactant products at constant pressure).

Thus, the mixture of carbon dioxide, oxygen and fuel may be combusted to provide a liquid and/or supercritical combustion product stream of carbon dioxide and steam (i.e. gaseous water). As shown in FIG. 2, the oxy-fuel combustor 32 may discharge the liquid and/or supercritical mixture of carbon dioxide and steam in State 5 at a temperature of 980° F. at a pressure of 2,200 psi. Preferably, at State 5, the pressure may be in the range of 2000 psi to 4000 psi and the temperature in the range of 800° F. to 1500° F.

After being discharged from the oxy-fuel combustor 32, the liquid and/or supercritical carbon dioxide and steam may flow through fluid passage 40 to an energy conversion apparatus or component that provides energy from a fluid flow, such as a multi-stage expansion turbine 42 to generate, e.g. electricity 44. Turbine 42 may be configured to receive the liquid and/or supercritical carbon dioxide from the oxy-fuel combustor 32, particularly from fluid passage 40, and operate by an expansion of the liquid and/or supercritical carbon dioxide back to gaseous carbon dioxide. In addition the turbine may be further configured to operate with isentropic expansion.

The turbine 42 may include fan blades mounted on a rotor or radial impellers mounted to a rotor. Upon entering turbines 42, the liquid and/or supercritical carbon dioxide and steam may expand, which the expansion causing rotation of the fan blades, and thus the rotor. The rotary motion/mechanical power may then used to rotate the armature of a generator which produces electricity. As noted above, optionally, heat discharged from the compressor 12 can be utilized to reheat the carbon dioxide and steam between the expansion stages to increase the efficiency of the expansion process.

Within the turbine 42, with the expansion of the liquid and/or supercritical carbon dioxide and steam and the associated decrease in temperature and pressure, the carbon dioxide may enter the gaseous phase and the steam may enter the liquid phase (water). As shown in FIG. 2, the steam turbine 42 may discharge the gaseous carbon dioxide and water in State 6 at a temperature of approximately 100° F. at a pressure of 15 psi, which is the same temperature and pressure at State 1.

After being discharged from the turbine 42, gaseous carbon dioxide and water may flow within fluid passage 46 to a water separator 48, which separates the water from the carbon dioxide and discharges it. Thereafter, the gaseous carbon dioxide may flow in fluid passage 50 back to compressor 12 and the cycle may be repeated.

With the foregoing system/cycle the following benefits may be obtained. First, decreased power demand to increase the carbon dioxide pressure may be realized because pumping of the carbon dioxide with pump 20 has relatively lower power requirements than compression with compressor 12. Second, the take-off or removal of the carbon dioxide is optimized for pipeline transport and no further compression or expansion may be required. Third, a relatively higher overall thermodynamic cycle efficiency may be reached with relatively low firing temperatures in the oxy-burner (less than or equal to 1000° F.). Because the thermodynamic cycle has a relatively low "sink" temperature, the overall efficiency is relatively high even at low combustor firing temperatures. This significantly simplifies the combustor and expander design.

While a preferred embodiment of the present invention has been described, it should be understood that various changes, adaptations and modifications can be made therein without departing from the spirit of the invention and the scope of the appended claims. The scope of the invention should, therefore, be determined not with reference to the above description, but instead should be determined with reference to the appended claims along with their full scope of equivalents. Furthermore, it should be understood that the appended claims do not necessarily comprise the broadest scope of the invention which the Applicant is entitled to claim, or the only manner(s) in which the invention may be claimed, or that all recited features are necessary.

What is claimed is:

1. A method for sequestering carbon dioxide from an oxy-fuel based power cycle, the method comprising the following steps:
supplying a turbine apparatus that provides energy in the form of a shaft output from a fluid flow and providing gaseous carbon dioxide and liquid water from said turbine apparatus, wherein said gaseous carbon dioxide and liquid water discharge from the turbine apparatus at a first density and a first temperature;
feeding said gaseous carbon dioxide and said liquid water directly from the turbine apparatus to a water separator and separating said liquid water from said gaseous carbon dioxide at approximately the first temperature;
compressing the gaseous carbon dioxide using a compressor to increase the first density to a second density to form a compressed gaseous carbon dioxide;
converting the compressed gaseous carbon dioxide at the second density to liquid carbon dioxide by cooling the compressed gaseous carbon dioxide;
converting all or a portion of the liquid carbon dioxide to supercritical carbon dioxide by compressing the liquid carbon dioxide;
removing a portion of the liquid and/or supercritical carbon dioxide from the cycle;
introducing oxygen, a combustion fuel and the liquid and/or supercritical carbon dioxide remaining in the cycle to an oxy-fuel combustor;
combusting the oxygen and the combustion fuel with the liquid and/or supercritical carbon dioxide at a temperature ranging from 800° F. to 1100° F. in the oxy-fuel combustor to generate an exhaust mixture comprising steam and liquid and/or supercritical carbon dioxide with additional carbon dioxide content where said additional carbon dioxide content is equal to said portion of the liquid and/or supercritical carbon dioxide removed from the cycle and replaces the portion of the liquid and/or supercritical carbon dioxide removed from the cycle;
introducing the exhaust mixture into said turbine apparatus that provides energy from a fluid flow; and expanding the liquid and/or supercritical carbon dioxide so as to convert the liquid and/or supercritical carbon dioxide to said gaseous carbon dioxide and said liquid water at the first density and at the first temperature.

2. The method of claim 1 wherein:
compressing the gaseous carbon dioxide to increase the first density to the second density of the gaseous carbon dioxide is performed within a compressor configured to provide isentropic compression.

3. The method of claim 1 wherein:
compressing the gaseous carbon dioxide to increase the first density to the second density of the gaseous carbon dioxide is performed within a compressor configured to provide isothermal compression.

4. The method of claim 3 wherein:
a temperature of the compressed gaseous carbon dioxide is in a range between and including 150° F. to 200° F.

5. The method of claim 1 wherein:
compressing the gaseous carbon dioxide to increase the first density to the second density of the gaseous carbon dioxide is performed at a pressure in a range between and including 300 psi to 400 psi.

6. The method of claim 1 wherein:
compressing the gaseous carbon dioxide to increase the first density to the second density of the gaseous carbon dioxide is performed at a pressure of at least 300 psi.

7. The method of claim 1 wherein:
converting the gaseous carbon dioxide to liquid carbon dioxide by cooling the gaseous carbon dioxide is performed within a condenser configured to provide isobaric cooling.

8. The method of claim 1 wherein:
converting the gaseous carbon dioxide to liquid carbon dioxide by cooling the gaseous carbon dioxide is performed by cooling to a temperature in a range between and including 0° F. to −60° F.

9. The method of claim 1 wherein:
converting the gaseous carbon dioxide to liquid carbon dioxide by cooling the gaseous carbon dioxide is performed by cooling to a temperature of at least −20° F.

10. The method of claim 1 wherein:
converting all or a portion of the liquid carbon dioxide to supercritical carbon dioxide is performed by compressing the liquid carbon dioxide within a cryogenic pump.

11. The method of claim 1 wherein:
converting all or a portion of the liquid carbon dioxide to supercritical carbon dioxide by compressing the liquid carbon dioxide is performed at a pressure in a range between and including 2000 psi to 4000 psi.

12. The method of claim 1 wherein:
converting all or a portion of the liquid carbon dioxide to supercritical carbon dioxide by compressing the liquid carbon dioxide is performed at a pressure of at least 2,200 psi.

13. The method of claim 1 wherein:
removing a portion of the liquid and/or supercritical carbon dioxide from the cycle is performed with a diverter device.

14. The method of claim 1 wherein:
the oxy-fuel combustor is configured to provide isobaric combustion.

15. The method of claim 1 wherein:
combusting the oxygen and the combustion fuel with the liquid and/or supercritical carbon dioxide at a temperature of about 1000° F.

16. The method of claim 1 wherein:
combusting the oxygen and the combustion fuel with the liquid and/or supercritical carbon dioxide produces the exhaust mixture at a pressure of about 2,200 psi.

17. The method of claim 1 wherein:
the apparatus that provided energy from a fluid flow is configured to provide isentropic expansion.

18. The method of claim 1 wherein:
heat is generated from compressing the gaseous carbon dioxide to increase the first density to the second density of the gaseous carbon dioxide; and
said heat is used to increase a temperature of the liquid and/or supercritical carbon dioxide prior to removing the portion of the liquid and/or supercritical carbon dioxide from the cycle.

19. The method of claim 1 wherein:
heat is generated from compressing the gaseous carbon dioxide to increase the first density to the second density of the gaseous carbon dioxide; and
said heat is used to increase a temperature of the steam and liquid and/or supercritical carbon dioxide introduced to the apparatus that provides energy from a fluid flow.

* * * * *